Patented Feb. 13, 1940

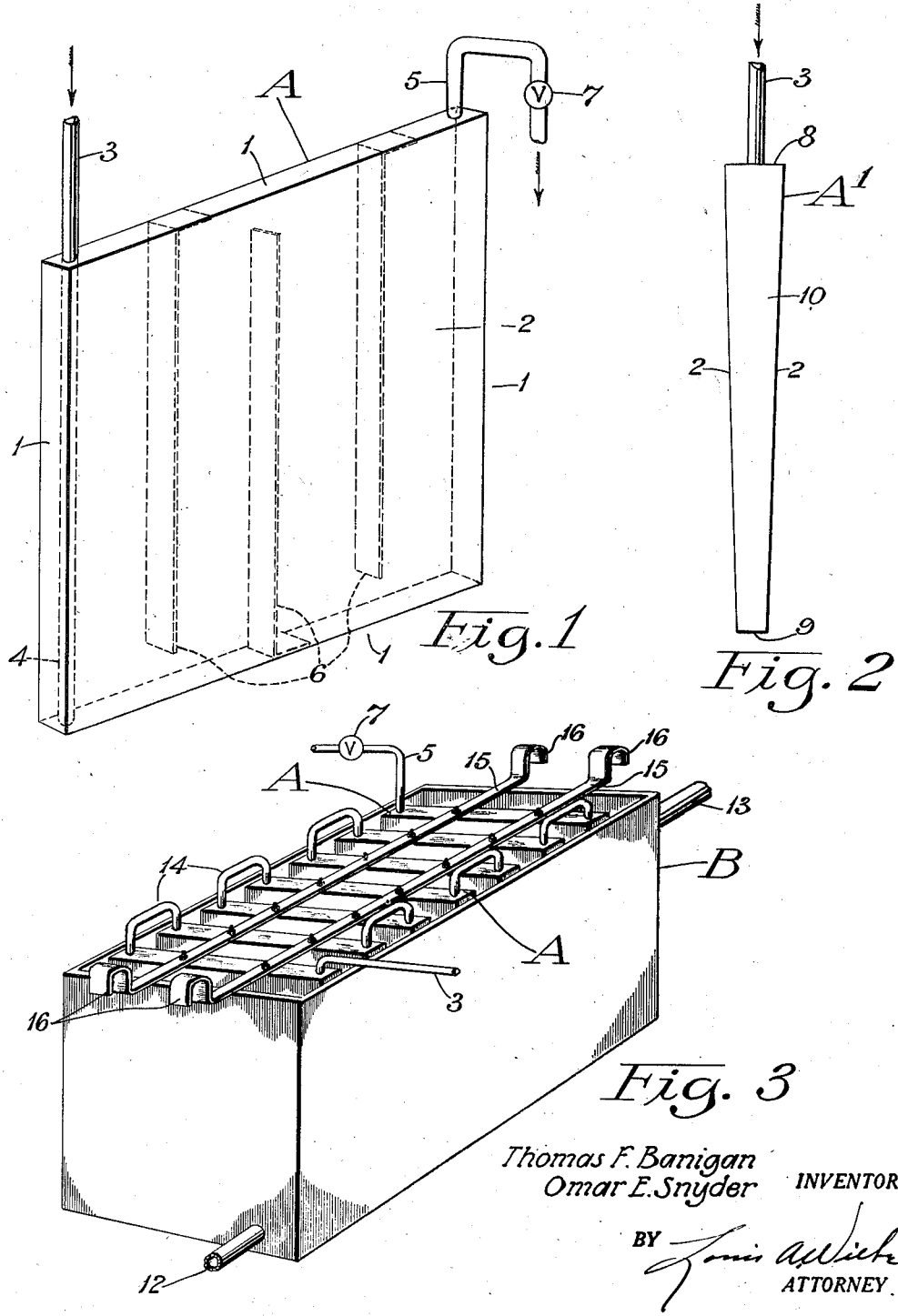

2,190,280

UNITED STATES PATENT OFFICE 2,190,280

RECOVERY OF GLAUBER'S SALT

Thomas F. Banigan, Kenmore, and Omar E. Snyder, Buffalo, N. Y., assignors to E. I. du Pont de Nemours & Company, Wilmington, Del., a corporation of Delaware Application February 11, 1938, Serial No. 189,948

7 Claims. (Cl. 62—124)

This invention relates to a method and apparatus for recovering solid substances from liquid phases containing them in the dissolved or molten state. This invention relates more particularly to a method of obtaining substances in crystalline or non-crystalline solid form from their solutions or melts by dipping into the solutions or melts members having a temperature different from that of said solutions, whereby the substance is deposited in solid form on the surfaces of said members.

One method of obtaining solids from solutions or melts thereof comprises the dipping, into the body of the solution or melt, coils of pipe through which is circulated a refrigerant such as cooled water or brine. Due to the reduced temperature of the coils, the solution or melt in contact with them becomes cooled. In the case of solutions of solids, supersaturation occurs adjacent to the cooled surfaces and the solid solute precipitates upon the surface. In the case of melts, the substance freezes upon the cooled surfaces.

This operates very efficiently at first because the coils have a high thermal conductivity, however, soon after this process has begun, a crust of the material is formed on and between adjacent coils. This crust has an insulating effect and interferes with the circulation of the liquid phase between adjacent coils. As a result, the efficiency falls off rapidly. This difficulty is more pronounced in the case of crystalline substances due to the fact that the crystals rapidly bridge the spaces between adjacent coils and quickly prevent circulation of the solution or melt between the coils. This phenomenon is known as "arching."

The crystals or deposits are removed from the coils only with the greatest difficulty. They cling very tenaciously to the surface of the pipes. During their crystal growth, they build up a network of interlocking crystals, forming arches between the pipes, which are very difficult to remove. In many cases, it is impossible to dislodge these crystals except by chipping. This is a tedious and expensive procedure and is likely to damage the coils. Furthermore, the weight and the pressure exerted by the crystals between successive coils sometimes seriously deforms them.

For these reasons other methods of recovery are commonly substituted. In some cases vacuum evaporation is resorted to but this is often too expensive or inefficient. However, for the recovery of crystalline hydrates or other substances which are likely to decompose at elevated temperatures or for those substances which show inverted solubility curves above certain temperatures, this refrigerated coil method of recovery, despite its disadvantages, is still the most practical one.

Therefore, it is an object of this invention to provide an improved apparatus for recovering solids from liquid phases containing them by immersing refrigerated surfaces on which the solid is deposited.

A further object is to provide an improved method and apparatus for depositing solids on the surfaces and removing the solids from the surfaces on which they are formed.

Another object is to provide a method and apparatus for semi-continuously removing solid substances from liquid phases containing them.

A further object is to provide a method and apparatus for cooling or heating liquids whereby to separate solids therefrom.

Other objects of the invention will appear hereinafter.

The objects of this invention may be accomplished by replacing the coils of pipe by thin walled, narrow enclosures through which a refrigerant is passed. It has been found that it is not only possible to obtain better transfer of heat by the use of enclosures having large planar surfaces but also the efficiency falls off much more slowly as crystallization progresses, due to the elimination of arching. Furthermore, it has been found that the crystals may be readily and easily loosened from the planar surfaces of the enclosures by merely warming, tapping or vibrating them, or by applying pressure or vacuum to the interior of the enclosures. The application of pressure or vacuum slightly bulges or collapses the thin, yieldable, planar surfaces thus dislodging the crystals.

In the recovery of Glauber's salt, which is the decahydrate of sodium sulfate, many of the aforementioned difficulties are experienced since the crystals isolated from their solution partially dissolve in their own water of hydration at temperatures above 32.4° C. and their solubility decreases at temperatures above this point. It is desirable to recover Glauber's salt by the immersion of a cooled surface in the relatively saturated solution despite the fact that the crystals are especially difficult to remove and the efficiency of operation falls off very rapidly during the crystal growth. It is particularly desirable in the recovery of Glauber's salt crystals to obtain them in the form of large uniform crystals. This can, of course, be accomplished by carefully controlling the conditions during crystallization. The formation of these large crystals, however, further increases the difficulty of their removal from the surfaces on which they are formed.

This invention will be more clearly understood by reference to the following description and accompanying illustrations of apparatus which may be used in recovering Glauber's salt from solutions of sodium sulfate in which:

Figure 1 is a perspective view showing the internal construction of one modification of the invention.

Figure 2 is an end view of another modification of the invention.

Figure 3 is a perspective view showing a plurality of refrigerating units connected in series.

Referring to Figure 1 of the drawing, A refers generally to an enclosure which may be positioned in a body of a liquid consisting of a solution or melt of a solid material. Reference numeral 1 designates the top and bottom and end walls of the enclosure A. The top, bottom and end walls of the enclosure may be constructed of a strong, rigid material such as a metal to serve as a framework for the enclosure. Two thin plates 2 are fastened to the framework in any suitable manner such as by welding to serve as side walls of the enclosure. The plates 2 are preferably made sufficiently thin so that they may be yieldable, or subject to distortion, upon the building up of a pressure or vacuum in the enclosure. The thin plates, as well as the framework of the enclosure, may be constructed of any suitable material, such as for example, ordinary or stainless steel, copper, nickel, Monel metal or the like. The enclosure is provided with an inlet conduit 3 which is preferably attached to the enclosure so as to project substantially to the bottom thereof as shown by 4 in the drawing. At the opposite end of the enclosure an outlet conduit 5 is provided. The outlet conduit is preferably constructed with a valve 7 whereby to permit the building up of the pressure within the enclosure. A refrigerating, or heating, liquid is forced into the enclosure through the inlet conduit 3 and out through the outlet conduit 5.

The enclosure is preferably provided with baffles 6 or the like in order to provide for a suitable circulation of the liquid through the enclosure. Such baffles, when used, are preferably attached only to the framework of the enclosure and not to the side walls thereof.

The modified form of enclosure A' shown in Figure 2 of the drawing, is constructed with the side walls converging towards the bottom 9 of the enclosure. The bottom 9 of the enclosure will, therefore, be somewhat narrower than the top 8. The end walls 10 of the enclosure will, therefore, be trapezoidal in shape. In this form of enclosure the distortion or vibration of the side walls 2 will cause a more efficient removal of the deposited solid material therefrom.

Referring to Figure 3 of the drawing, reference letter B designates a large tank preferably provided with an inlet conduit 12 and an outlet conduit 13 for passing a liquid containing a solid material or a melt of a solid material therethrough. A plurality of enclosures A are connected in series with a source of refrigerating fluid. The refrigerating fluid is passed into the first of the enclosures A through inlet conduit 3. From the first enclosure the fluid is passed successfully through the succeeding enclosures by means of conduits 14 which connect the enclosures in series. The refrigerating fluid is passed from the last enclosure through the outlet conduit 5 which is provided with a valve 7 for the reasons above outlined. The various enclosures A are connected to each other in any desired manner, for example, by means of connecting bars 15 as shown in Figure 3. The connecting bars 15 may be provided with curved extensions 16 whereby to lift the combined set of enclosures A from the tank B.

In the practice of the present invention for the crystallization of sodium sulfate decahydrate (Glauber's salt), one or more of the enclosures A are suspended in a tank containing a warm, relatively concentrated solution of sodium sulfate. A refrigerant such as cold water or brine is circulated through the enclosure or enclosures. As soon as the cooled enclosures are suspended in the solution crystals begin to form on their surfaces. The enclosures remain in the crytallizing bath until the optimum growth of crystals has occurred. The optimum growth of crystals on the enclosures may be determined by the size of the enclosure, the temperature of the cooling medium, the rate of flow of the cooling medium and of the sodium sulfate solution, the concentration of the sodium sulfate solution, and the efficiency of the cooling and crystallization as well as the most convenient operating cycle from an economic standpoint.

After the optimum growth of crystals has taken place, the enclosure or enclosures are removed to a convenient location and are given several sharp blows which are directed to the framework of the enclosures. Obviously other means may be used to set up a vibration of the side walls of the enclosures. Due to the thinness of the side plates they will be easily distorted or caused to yield since they are fastened to the framework only at their edges. Thus being subject to distortion, a vibration is set up over their whole surface. This flexing of the side plates cracks and dislodges the encrusted crystals. The dislodgment of the crystals and their removal is facilitated by using a tapered enclosure such as shown in Figure 2 of the drawing.

An especially convenient method of removing the crytals from the side plates of the enclosures comprises the step of closing the valve 7 in the outlet conduit 5 and permitting the pressure of the refrigerant to build up until the side plates of the enclosures are caused to bulge. This bulging or distortion of the side plates cracks the coating of encrusted crystals and dislodges them. The material resilience of the metal causes the side plates to return to their original position after releasing of the pressure. The removal of the crystals may be further facilitated by causing a rapid vibration of the surface when the pressure is applied, for example, by supplying the refrigerant in a pulsating flow as from a piston pump.

The side plates of the enclosures may be bulged by the use of fluid materials other than the refrigerant. For example, where pressure may be applied through inlet conduit 3 and caused to build up a pressure by closing valve 7. Alternatively, a vacuum can be created in the enclosure by a connection of a vacuum pump to conduit 3 after closing the valve 7. Furthermore, an alternate vacuum and pressure can be set up in the enclosures.

Another method of removing the deposits, which is particularly adaptable to those substances which melt or dissolve when heated, comprises the circulation of heated water or the like through the enclosures for a short period of time. Since the side plates are very thin and there is no arching of the crystal growth such as that which occurs when coils or pipes are used, the heat causes the crystals adhering directly to the surface to dissolve or melt and thereby quickly dislodges the entire mass. This operates very efficiently and rapidly and the amount of crystals dissolved or melted to free the mass is negligible. The apparatus shown in Figure 3 of the drawing may, if desired, be operated as a semi-continuous method of salt recovery. This may be accomplished by employing a circulating saturated solution of sodium sulfate in the tank B. In this case, the enclosures are suspended in a permanent position since it will not be necessary to withdraw them from the solution to remove the crystals. The refrigerating medium is circulated through the enclosures and a crust of salt crystals is formed on their surfaces. After a sufficient number of crystals have been formed, pressure or vacuum is applied to the interior of the enclosures, or they may be vibrated, or warm water circulated through them for removal of the crystals. The crystals will be loosened and dislodged as above outlined, and will fall to the bottom of the tank whereupon cooling water is again circulated through the enclosures and the cycle repeated. Since the solution is saturated, the freed crystals will not dissolve. The crystals may be removed from the tank in any convenient, continuous or discontinuous manner.

Besides the specific application of this apparatus to the recovery of solids from liquids containing them in the dissolved or molten state, it can be applied generally to the cooling and heating of liquids. It is well known that when the temperature of many liquids is reduced, solids are deposited on the cooling surfaces in a manner similar to that described previously. This seriously decreases the efficiency of the process. Similarly, due to inverted solubility curves or chemical reactions such as the conversion of alkaline earth bicarbonates to the insoluble carbonate, for example, in water having temporary hardness, tenacious deposits are often formed on heating coils. These formations not only impair the efficiency of heat transfer but due to their insulating effects cause serious overheating of sections of the coils resulting in bursting, with consequent damage and delay as well as constituting a safety hazard. It has been found that by applying the principles of this invention, one is enabled to eliminate these difficulties irrespective of their cause. The efficiency of the enclosures is not materially impaired until relatively large quantities of solids have been deposited and these deposits can be readily removed by some one of the methods described above.

It has further been found that in many of these heating and cooling processes where the formation of deposits has long been a serious problem and where the efficiency has been materially reduced and large amounts of time and money have been spent in removing the deposits and repairing the coils, these disadvantages can now be turned into a practicable advantage by the practice of this invention. Due to the ease of removal of the deposits from the enclosures, it is economically feasible to recover the material comprising these deposits on a commercial basis. The utilization of these materials not only constitutes a considerable saving but over a period of time may represent an appreciable profit.

Since it will be obvious that many changes and modifications can be made in the above-described details without departing from the nature and spirit of the invention, it is to be understood that the invention is not to be limited except as set forth in the appended claims.

We claim:

1. In an apparatus for removing Glauber's salt from a concentrated solution thereof, a plurality of metallic enclosures adapted to be positioned in a body of said liquid, said enclosures connected with each other in series by fluid-transmitting means, said enclosures being connected by means capable of supporting them while they are raised from and lowered into the said solution, each of said enclosures comprising opposed yieldable crystallizing planar surfaces and provided with inlet and outlet means through which a liquid temperature controlling medium may be forced, a plurality of baffles between said inlet and outlet means to cause circulation of the liquid temperature controlling medium along the said planar crystallizing walls, and the last in the series of said enclosures having a valve in its outlet means.

2. The method of removing salt from a concentrated liquid solution thereof, which comprises inserting, in a body of said solution, a hollow member having flat, yieldable planar wall surfaces which are cooled by flowing a refrigerant through said hollow member, and having a temperature sufficiently different from that of said solution to cause the said salt to crystallize out on said wall surfaces, allowing said salt to crystallize on said wall surfaces, raising said member from the body of solution and removing the said crystallized salt from said hollow member by distorting said wall surfaces, said distortion resulting from suddenly interrupting the discharge of said refrigerant from said hollow member.

3. In an apparatus for removing Glauber's salt from concentrated solutions thereof, an enclosure including yieldable planar walls and an inlet and an outlet located in the top thereof through which a liquid temperature controlling medium may be passed, means for holding said enclosure suspended in the concentrated solution of the said salt, said inlet and outlet being so arranged as not to interfere with the removal of the enclosure from the said solution, and means in said outlet for suddenly stopping the flow of said temperature controlling medium whereby to build up a pressure in said enclosure and cause said planar walls to yield sufficiently to bring about separation therefrom of any Glauber's salt which has crystallized thereon.

4. An apparatus for removing Glauber's salt from a concentrated solution thereof, said apparatus comprising a casing having therein a concentrated solution of said salt, a hollow enclosure having means for suspending it in said solution in said casing, said enclosure comprising essentially relatively-extensive, oppositely-disposed, converging, readily-distorted planar surfaces, a plurality of baffles between said oppositely-disposed surfaces, and cooperating therewith to provide a sinuous path for the cooling fluid, a top inlet and a top outlet for the enclosure, the inlet extending to near the bottom of the hollow space in said enclosure, the inlet and outlet being arranged to permit the enclosure to be removed from or replaced in said casing without disassembling the latter, and the enclosure being constructed of stainless steel.

5. The process of claim 2 when the salt is Glauber's salt.

6. An apparatus of the type recited in claim 3 wherein the enclosure is constructed entirely of metal from the group consisting of stainless steel, copper, nickel and Monel metal.

7. An apparatus of the type recited in claim 3 wherein the inlet extends almost to the bottom of the enclosure, and wherein the enclosure contains a plurality of baffles located between the inlet and outlet means.

THOMAS F. BANIGAN.
OMAR E. SNYDER.